(12) United States Patent
Zweig

(10) Patent No.: US 11,673,684 B2
(45) Date of Patent: Jun. 13, 2023

(54) SYSTEM AND METHOD FOR MONITORING THE STRUCTURAL HEALTH OF COMPONENTS

(71) Applicant: THE BOEING COMPANY, Chicago, IL (US)

(72) Inventor: Andrew M. Zweig, Chesterfield, MO (US)

(73) Assignee: THE BOEING COMPANY, Arlington, VA (US)

( * ) Notice: Subject to any disclaimer, the term of this patent is extended or adjusted under 35 U.S.C. 154(b) by 345 days.

(21) Appl. No.: 15/931,532

(22) Filed: May 13, 2020

(65) Prior Publication Data

US 2021/0354847 A1 Nov. 18, 2021

(51) Int. Cl.
*B64D 45/00* (2006.01)
*G01L 1/24* (2006.01)

(52) U.S. Cl.
CPC ............. *B64D 45/00* (2013.01); *G01L 1/242* (2013.01); *B64D 2045/0085* (2013.01)

(58) Field of Classification Search
CPC .. B64D 45/00; B64D 2045/0085; G01L 1/242
USPC ........................................................ 340/945
See application file for complete search history.

(56) References Cited

U.S. PATENT DOCUMENTS

| | | | | |
|---|---|---|---|---|
| 5,525,796 A * | 6/1996 | Haake | ................... | B64D 45/00 356/34 |
| 8,964,172 B1 * | 2/2015 | Breiholz | ................. | G01L 1/242 356/73.1 |
| 9,372,214 B2 * | 6/2016 | Strid | ......................... | H01P 3/16 |
| 9,709,459 B1 * | 7/2017 | Guthrie | ................ | G01M 11/085 |
| 10,018,735 B2 * | 7/2018 | Ronda | ................. | C09K 11/7773 |
| 10,833,774 B2 * | 11/2020 | Laughlin | ................ | H04B 10/66 |
| 2005/0067559 A1 * | 3/2005 | Ogisu | ................... | G01M 11/086 250/227.14 |

OTHER PUBLICATIONS

Joselle M. McCracken, Brian R. Donovan, and Timothy J. White, "Materials as Machines," Adv. Material 2020, 48 pages.
(Continued)

*Primary Examiner* — Brent Swarthout
*Assistant Examiner* — Mancil Littlejohn, Jr.
(74) *Attorney, Agent, or Firm* — Patterson + Sheridan, LLP

(57) ABSTRACT

Aspects of the present disclosure generally relate to systems and methods for monitoring the structural health of components. In an aspect is provided a system for monitoring structural health of a component that includes a mechanotropic elastomeric (ME) layer at least partially disposed on a surface of the component, the ME layer having a first portion corresponding to a first end of the component and a second portion corresponding to a second end of the component; a fiber optic light guide coupled to the first end; and a detector coupled to the second end. In another aspect is provided a method that includes pulsing an electromagnetic energy source coupled to a system comprising a ME layer; and detecting a wavelength or wavelength range by a detector, the detected wavelength or wavelength range being responsive to an amount of stimulus and being indicative of a deformation in a component.

20 Claims, 4 Drawing Sheets

400
402 — Apply a mechanotropic elastomeric (ME) layer to a surface of a component
404 — Couple a fiber optic light guide to the ME layer
406 — Couple a detector to the ME layer

(56) References Cited

OTHER PUBLICATIONS

Devin J. Roach, Chao Yuan, Xiao Kuang, Vincent Chi-Fung Li, Peter Blake, Marta Lechuga Romero, Irene Hammel, Kai Yu, and H. Jerry Qi, "Long Liquid Crystal Elastomer Fibers with Large Reversible Actuation Strains for Smart Textiles and Artificial Muscles," ACS Appl. Material Interfaces, 2019, 11, 19514-19521.

Anup Sankar Sadangi, Sujit Kumar Sahu, Karali Patra, "A Controlled Conditioning Interface Unit for Dielectric Elastomer Generator," IEEE, 2019, 13 pages.

Hongrui Jiang, Chensha Li, Xuezhen Huang, "Actuators Based On Liquid Crystalline Elastomer Materials," Nanoscale. Jun. 21, 2013; 5(12): 5225-5240.

Brian R. Donovan, Hayden E. Fowler, Valentina M. Matavulj, and Timothy J. White, "Mechanotropic Elastomers," 2019, Angew. Chem. Int. Ed, 2019, 13744-13748.

Brian R. Donovan, Hayden E. Fowler, Valentina M. Matavulj, and Timothy J. White, "Mechanotropic Elastomers—Supporting Information," 2019, Angew. Chem. Int. Ed, 2019, 10 pages.

\* cited by examiner

SYSTEM AND METHOD FOR MONITORING THE STRUCTURAL HEALTH OF COMPONENTS

FIELD

Aspects of the present disclosure generally relate to systems and methods for monitoring the structural health of components.

BACKGROUND

Monitoring the structural health of components, which are subject to fatigue, stress-strain, and corrosion, is valuable in many industries in order to reduce operating costs while maintaining high standards of safety. Detecting structural defects and damage as they form during the operational life of components can be difficult, however, particularly when the defects and damage are under a surface coating, e.g., paint. Conventional systems and methods of monitoring defects rely on the conductivity of a metallic element or wire embedded in a component being monitored. Such wires and metallic elements are subject to loss of signal-carrying capability due to corrosion and electromagnetic interference. In addition, the inclusion of such metallic elements and wires is labor intensive and adds another source of weight. The added weight can be particularly problematic in applications—such as aircraft, land vehicles, and satellite systems—where the components should be lightweight. In addition, some conventional systems lack the ability to monitor structural aging real-time, leaving the structures subject to extensive damage or catastrophic failure when the defect propagates throughout the structure.

There is a need for new and improved systems and methods for monitoring the structural health of components.

SUMMARY

Aspects of the present disclosure generally relate to systems and methods for monitoring the structural health of components.

Aspects of the present disclosure provide a system for monitoring structural health of a component that includes a mechanotropic elastomeric (ME) layer at least partially disposed on a surface or subsurface of the component, the ME layer having a first portion corresponding to a first end of the component and a second portion corresponding to a second end of the component; a fiber optic light guide coupled to the first end by a first adhesive; and an optical detector coupled to the second end by a second adhesive.

Aspects of the present disclosure further provide a method for forming a system for monitoring structural health of a component that includes applying a mechanotropic elastomeric (ME) layer to a surface or subsurface of the component, the ME layer having a first portion corresponding to a first end of the component and a second portion corresponding to a second end of the component; coupling a fiber optic light guide to the first end of the ME layer using a first adhesive; and coupling an optical detector to the second end of the ME layer using a second adhesive.

Aspects of the present disclosure further provide a method for monitoring structural health of a component that includes pulsing an electromagnetic energy source coupled to a system, the system comprising a mechanotropic elastomeric (ME) layer, a fiber optic light guide, and an optical detector, the ME layer having a reference wavelength or wavelength range; and detecting a wavelength or wavelength range by the optical detector, the detected wavelength or wavelength range being responsive to application of an amount of stimulus and being indicative of a deformation or a defect in the component, wherein the ME layer is at least partially disposed on a surface or subsurface of the component, and wherein the fiber optic light guide is in optical communication with the ME layer and with the optical detector.

Aspects of the present disclosure further provide a structure for monitoring structural health of a component that includes a mechanotropic elastomeric (ME) layer and a topcoat layer.

BRIEF DESCRIPTION OF THE DRAWINGS

So that the manner in which the above recited features can be understood in detail, a more particular description, briefly summarized above, may be had by reference to example aspects, some of which are illustrated in the appended drawings. It is to be noted, however, that the appended drawings illustrate only exemplary aspects and are therefore not to be considered limiting of its scope, for the disclosure may admit to other equally effective aspects.

DETAILED DESCRIPTION

Figure 1A:
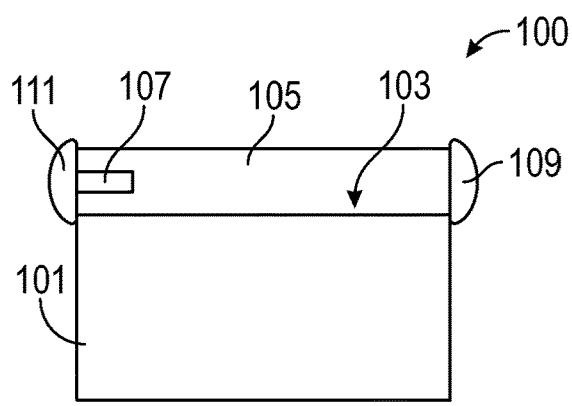
FIG. 1A is an example system for monitoring the structural health of a component according to at least one aspect of the present disclosure.

Aspects of the present disclosure generally relate to systems and methods for monitoring the structural health of components. The inventor has discovered a structural health monitoring system and method that employs an optically conductive layer of a mechanotropic elastomer, such as a liquid crystal elastomer (LCE). The mechanotropic elastomer can be capable of producing a change in color, e.g., a wavelength transmitted, in response to a stimulus, thereby indicating that, e.g., a defect or a change, in the structure has formed. The optically conductive layer can be applied to a surface of a component by, e.g., spraying or printing or can be incorporated into a component during its fabrication as an additional ply or layer. The entire width of the optically conductive layer, or a portion thereof, can act as an electromagnetic energy guide, and is not dependent on a single wire or pathway as are conventional structural monitoring systems. Sensors or detectors can be used to identify and even localize damage within the component. The effect of the change in electromagnetic energy transmittance by the mechanotropic elastomer when exposed to a stimulus or force can assist in determining changes in the component during its operational life as well as changes over time due to deformation, degradation, and/or damage to the component. By monitoring deformation, degradation, and/or damage, stress on the part as well as failure of a part can be monitored Certain aspects of the present disclosure can enable early detection and/or real-time detection of stresses, defects, and/or flaws as they form in components. Such early and/or real-time detection enables more efficient scheduling of maintenance and repairs, and can avert catastrophic problems that may go unnoticed. The systems and methods can enable detection of structural defects during the operational life of a component before the damage can propagate and cause serious damage to the component and/or nearby components. Although certain aspects of the present disclosure are described with reference to aircraft, the systems and methods can extend to any structural element(s) of non-stationary structures such as vehicles and ships, to permanent structures such as bridges, buildings, and pipelines. The systems and methods described herein can not only provide non-destructive, real-time monitoring, but can also be low cost, especially when measured against costs associated with the failure of components. In addition, the systems and methods described herein can enable detection of structural defects and damage that can be hidden under, e.g., a surface coating.

Conventional systems and methods of monitoring defects that rely on the conductivity of metallic elements or wires embedded in components are subject to loss of signal-carrying capability due to corrosion and electromagnetic interference. Such systems and methods are labor intensive, costly, and add an undesired amount of weight. Some conventional systems, such as acoustic systems, lack the ability to monitor structural aging real-time, leaving the structures subject to extensive damage or catastrophic failure when the defect propagates throughout the component. Piezoelectric systems can monitor systems in real-time, but as mentioned before, they are susceptible to electromagnetic field interference.

For purposes of this disclosure and unless otherwise indicated, all numbers indicating quantities are to be understood as being modified by the term "about" in all instances. It should also be understood that the numerical values used in the specification and claims constitute specific aspects.

As used herein, the indefinite article "a" or "an" shall mean "at least one" unless specified to the contrary or the context clearly indicates otherwise. For example, aspects comprising "a layer" include aspects comprising one, two, or more layers, unless specified to the contrary or the context clearly indicates only one layer is included.

For purposes of this disclosure, a surface of a component can include a top surface, bottom surface, subsurface, side surface, an interior surface, an exterior surface, and/or in a layer of a component unless specified to the contrary or the context clearly indicates otherwise. For example, aspects comprising a surface of the component, includes aspects comprising a subsurface of the component.

Certain aspects described herein include mechanotropic elastomers. Conventional uses of mechanotropic elastomers involve observing how light or other energy as an input affects a mechanical output. For example, conventional use of mechanotropic elastomer materials is to make artificial muscles or micro/nano-scale machines that move when an electrical stimulus is applied. In contrast, systems and methods described herein use mechanical input, e.g., a stimulus, to generate a variation in the electromagnetic output of the mechanotropic elastomer material. The systems and methods described herein can use mechanical input to attenuate electromagnetic energy transmission properties of elastomeric materials at various wavelengths of energy to create varying optical output.

In at least one aspect, and as described below, the mechanotropic elastomer is on one or more surfaces of a component to be monitored for changes, deformation, damage, defects, etc. Electromagnetic energy can pulse through the mechanotropic elastomer and the mechanotropic elastomer transmits a wavelength or wavelength range of energy in a "normal state", e.g., wavelength 1 or wavelength range 1. In its normal state, the mechanotropic elastomer has no apparent force or stimuli acting on it. When the component to be monitored deforms or becomes damaged, a force or stimuli acts on the mechanotropic elastomer to bend, strain, or deform. The change in stimuli or force on the mechanotropic elastomer causes the mechanotropic elastomer to transmit a different wavelength, e.g., wavelength 2 or wavelength range 2. The change in transmission from wavelength/wavelength range 1 to wavelength/wavelength range 2 can be detected and can be indicative of the change of health (e.g., loss of health) of the component.

In normal optical fibers used for telecommunications, the fiber is coated with a low refractive index material to prevent loss of signal as the signal bounces off the interface between the coating and the fiber. If the fiber is bent slightly, this loss could be greater were it not for the low refractive index coating. In contrast, the systems and methods described herein can be free of a low refractive index coating that prevents signal (e.g., electromagnetic energy) loss, and the signal loss can be exploited by systems and methods described herein. For example, if a stimuli or force, e.g., stress, is applied to the component, and the component stresses, bends, or deforms, the electromagnetic energy transmitted through the mechanotropic elastomer will vary in some proportion to that deformation rate or occurrence. Such information can be part of a baseline for understanding the routine stress that the component experiences. If the component experiences permanent stress, then the variation of electromagnetic energy transmission can also permanently change and be indicative of the health of the component. This variation in electromagnetic energy can be read by, e.g., a detector or sensor.

As non-limiting examples, damage can be any change to the material and/or geometric properties of a component, including deformations, defects, cracks, flaws, fractures, detachments, delaminations, corrosion damage, weaknesses, and any other change in condition of a component. Such damage can be caused by a stimulus or force. Non-limiting examples of a stimulus or force can include temperature, pressure, strain stress, applied force, gravitational force, normal force, friction force, air resistance force, tension force, or spring force.

FIG. 1A illustrates an example system 100 for monitoring the structural health (e.g., a change of a condition) of a component according to at least one aspect. The example system 100 includes a component 101 which is a component to be monitored for experiencing a change in condition, such as defects and damage, providing diagnostic information that can, e.g., help engineers design an improved version of the component. The example system 100 can further include a mechanotropic elastomeric (ME) layer 105, such as a mechanotropic elastomeric optical (MEO) layer, at least partially disposed on a surface 103 of the component 101. The ME layer can have a first portion and a second portion that correspond to a first end and a second end of the component, respectively. A fiber optic light guide 107 can be coupled, e.g., optically coupled, to the first end of the ME layer 105 by, e.g., an optical adhesive. The optical adhesive can be optically clear adhesive at a specified wavelength or wavelength range. For example, an optically clear adhesive such as EpoTek™ 305 has >91% transmission at 250 nm, and >98% transmission between 400 nm and 1600 nm. To attach the fiber optic light guide 107, a mechanical attachment, such as by bolting and/or grafting, can be used in addition to the optical adhesive. In such cases, the interface between the ME layer 105 and the fiber optic light guide 107 should be non-interfering and/or optically clear. The fiber optic light guide 107 serves to transmit electromagnetic energy (e.g., illumination) provided by an electromagnetic energy source. An optical detector or sensor 109 can be coupled to the second end the ME layer 105 by, e.g., an optical adhesive, such as an optically clear adhesive. The optical detector or sensor 109 serves to detect or sense a wavelength, or range of wavelengths, of electromagnetic energy transmitted by the ME layer. As an example, stress on the component 101 imparts stress on the ME layer 105. Because of the stress, the ME layer 105 transmits electromagnetic energy that can be detected by the detector or sensor 109. Non-limiting examples of the optical detector or sensor 109 can include a diode, photovoltaic devices, photoconductive devices, and phototransitor devices.

The fiber optic light guide 107 can, instead, be an electrical signal sent by, e.g., a light-emitting diode (LED), and the LED generates light that passes through the ME layer 105. At the receiving end, the detector or sensor 109 can detect the optical signal and convert it back to an electrical signal. The electrical signal can be transmitted to a control processor which can analyze the signal output and compare it to baseline data of the ME layer. Depending on desired use, the electrical signal can be more durable/robust, and can be easier to install than a fiber optic line. The energy can be transmitted to the LED at the remote end of the part (e.g., spar, strut, wing, or stringer) and be detected at the close end of the component.

In at least one aspect, an electromagnetic energy source 111 can be coupled to the fiber optic light guide 107 by, e.g., an optical adhesive, such as an optically clear adhesive. This electromagnetic energy source 111 can be coupled to the fiber optic light guide 107 of the system permanently such that real-time data can be collected. For example, if the ME layer 105 undergoes a stress and changes its crystallinity and/or optical transmission spectrum, the ME layer is acting like a filter that responds to physical stress. In some aspects, the electromagnetic energy source 111 can be coupled to the fiber optic light guide 107 of example system 100 when the component is being monitored periodically, such as for scheduled maintenance.

In at least one aspect, a periodic system of monitoring a change of condition (e.g., loss of health, damage) of a component over a monitored area can include data storage instead of a full data processing system. The data may include flex, stress, torsion, etc. information and if a discontinuity develops, the signal transmission declines indicating something has happened to the part. Here, the data can be retrieved periodically and processed at a maintenance depot or facility. In at least one aspect, the periodic system of monitoring can include no data collection during operation of the component (e.g., operation of a component during flight), and then the electromagnetic energy source 111 and/or the detector or sensor 109 can be coupled to the example system 100 at a maintenance depot or facility. For example, a maintenance connector, such as a module, can be connected to, e.g., an on-board diagnostic (OBD) port, enabling interface with the vehicle's computer system. Such a periodic system can enable collection of data off-line.

In these and other aspects, the ME layer can be a continuous layer on one or more surfaces of a component to be monitored. The surface of the component can be a top surface, bottom surface, subsurface, side surface, an interior surface, an exterior surface, and/or in a layer of a component. When the ME layer is at least partially exposed at an end of a component as, e.g., a layer in a multi-layer structure or as part of a paint stack-up, then the electromagnetic energy source can be coupled to the ME layer. In certain aspects, the electromagnetic energy source can be at one end of the component, and the detector can be at a second end of the component.

The ME layer can include one or more elastomers and/or elastomeric materials that are responsive to stimuli. For example, if a stimuli or force, e.g., stress, is applied to the component, and the component stresses, bends, or deforms, the electromagnetic energy transmitted through the ME layer will vary in some proportion to that deformation rate or occurrence. Elastomers are generally polymeric materials that can be deformed and are generally capable of withstanding elastic deformation. Suitable elastomers can include polymers, copolymers, composites, and/or mixtures of polymers and copolymers. In at least one aspect, the ME layer can include a mechanotropic elastomer, such as a liquid crystal elastomer. Liquid crystal elastomers are responsive to stimuli and are polymers having anisotropic properties. When liquid crystal elastomers are subjected to a stimulus, e.g., a stress, the liquid crystal mesogens within the elastomer can reorient in certain directions causing the elastomer to change its shape by, for example, bending, curling, and/or shrinking.

Suitable elastomers or portions of elastomers that can be included in the ME layer can include thermoplastic elastomers, styrenic materials, olefin materials, polyolefins, polyurethane thermoplastic elastomers, polyamides, synthetic rubbers, polydimethylsiloxanes, polybutadienes, polystyrenes, polyisobutylenes, polybenzenes, ethylene-butadiene-styrenes, polyurethanes, polychloroprenes, polyfluorenes, polymer-containing hydrazines, fluorene-modified elastomers, derivatives thereof, or a combination thereof. Other elastomers, or portions of elastomers that can be additionally, or alternatively, included in the ME layer can include polyesters, poly(lactic acid), poly(acrylonitrile-butadiene-styrene), poly(ethylene), poly(propylene), poly(caprolactone), poly(tetrafluoroethylene), poly(methyl methacrylate), polyether ether ketone (PEEK), poly(glycolic acid), poly (lactic-co-glycolic acid), poly(carbonate), poly(vinyl chloride), nylon, perfluoropolyethers, cyclic olefin copolymers, alginate, hyaluronic acid, cellulose, and other polysaccharides, thiol-ene elastomers, thiol-ene viscoelastic polymers, thiol-ene glassy polymers, terpene-derived poly(thioethers), poly(glycerol-co-sebacate), derivatives thereof, and/or a combination thereof.

Non-limiting examples of elastomers or portions of elastomers that can be additionally, or alternatively, included in the ME layer can include elastomers made from monomers such as thiol-enes, acrylates, urethanes, siloxanes, azobenzenes, olefins, polyesters, and polycarbonates, derivatives thereof, or a combination thereof.

In at least one aspect, the elastomer can be selected based on its properties such as, at least, electromagnetic energy transmission properties, bulk modulus, coefficient of thermal expansion, glass transition temperature, and/or Young's modulus. These properties can be modulated depending on the placement of the ME layer relative to the component and the size of the component. For example, the energy transmission properties can be high when the component is large such as an aircraft wing. In at least some aspects, the elastomer's coefficient of thermal expansion (CTE) can be chosen to match or substantially match the CTE of the materials surrounding it, such as above and below the elastomer in a stack-up or coating layer configuration. A mismatch of the CTE between materials can cause fracture and delamination/distortion after a number of hot/cold cycles. In at least one aspect, the elastomer's glass transition temperature (Tg) can be about 240° F. or more. For liquid crystal elastomers, the liquid crystal nature of the material typically requires that the Tg should be above the operational range of the material, and the inside of, e.g., a wing can be very hot after sitting on a runway for a number of hours in the heat. In at least one aspect, the bulk modulus of the elastomer can be chose such that it is lower than the bulk modulus of the surrounding materials such that the elastomer can deform under an applied load. In at least some aspects, the electromagnetic energy transmission can be chosen based on the transparency over a certain distance. The distance can be correlated to the component being monitored. For example, the elastomer can be sufficiently transparent over a distance of about 0.1 m or less, 0.5 m or less, 1 m or less, 5 m or less, 10 m or less, 20 m or less, or 30 m or less. For a 777X jet, the wing can be 80-90 feet (24 m to about 27 m).

The optical adhesive is used to bond and/or to cement optical components together and/or to an optical system. In some aspects, the optical adhesive should provide sufficient clarity at a wavelength or wavelength range such that the system can perform according to the objective desired. For example, the optical adhesive should have sufficient optical transmittance of the desired range of wavelengths for the particular application. Additionally or alternatively, the optical adhesive should be resistant to embrittlement and/or have a coefficient of thermal expansion similar to or matching that of the other materials present in the system. When two layers have substantially different coefficients of thermal expansion, the effect of hot-cold thermal cycling can cause stress cracking to occur. In some aspects, the optical adhesive can be an optically clear adhesive. Non-limiting examples of optical adhesives and/or optically clear adhesives can include epoxies, urethanes, silicones, acrylics, cyanoacrylates, and polyester resin based materials. These adhesives can be cured/hardened by a variety of methods such as catalytic cures at ambient or elevated temperatures, exposure to ultraviolet (UV) or visible light cures, high energy radiation cures, and moisture cures, or a combination thereof. The cure can be, e.g., a single cure, a dual core, or a multi-cure. For example, a single cure of an acrylic can be performed by exposure to UV light, while a double cure of an acrylic can be accomplished by exposure to UV light plus heat. As another example, a single cure of a silicone can be performed by exposure to UV light, and a double cure of a silicone can be accomplished by exposure to UV light plus moisture. The optical adhesive and/or optically clear adhesive can be dispensed using pneumatic pumps, syringe dispensers, dispensing valves, diaphragm valves, positive-displacement valves, disposable fluid path valves, needle valves, spool valves, and the like, or a combination thereof. Curing lamps, light guns, LEDs, heat sources, hardeners, catalysts, moisture, and the like, or a combination thereof, can be used for curing.

As described above, the electromagnetic energy source 111 serves to emit energy (e.g., light) that can be monitored by the detector. Non-limiting examples of the electromagnetic energy source 111 can include a laser, a LED, a UV lamp, a plasma-based UV source, a fluorescent lamp, a light bulb, a xenon lamp, a mercury lamp, a heat source, a thermal radiation source, blue lights, or a combination thereof. The electromagnetic energy source 111 can emit narrow bands or wide bands of electromagnetic energy. The electromagnetic energy source 111 can be combined with an optical filter and/or other optical elements so as to target specific wavelengths or specific ranges of wavelengths. In at least one aspect, the electromagnetic energy source can be doped to enhance light emission at one or more particular wavelengths. For example, a doped mercury bulb can have enhanced light emission at about 313 nm. Selection of the electromagnetic energy source 111 can be based on, e.g., the length of the part involved, the temperature dependence of the transmission of the ME layer, and probably cost. For example, some materials might have very high transmission in the Near IR (can use this for a reference signal), and can be attenuated by a color change of the ME layer in the UV or VIS range (can use this as the detected signal). A change of the detected signal from the reference signal can provide information on the change in condition of a component as described below.

In some aspects, the electromagnetic energy source 111 can emit light across a broadband of wavelengths from about 150 nm to about 800 nm. In some aspects, a single wavelength can be used. The single wavelength source can be a laser. For example, $Xe_2^*$ (wavelength of about 172 nm), KrCl* (wavelength of about 222 nm), KrF (wavelength of about 248 nm), XeBr (wavelength of about 282 nm), or XeCl (wavelength of about 308 nm) can generate UV radiation. Medium-pressure mercury bulbs (about 200 nm to about 400 nm) can be used. Mercury bulbs have a strong emission at wavelength of about 254 nm and lesser emissions at wavelengths of about 310 nm and about 370 nm. In some aspects, multiple electromagnetic energy sources may be used.

Non-limiting examples of electromagnetic energy transmitted, emitted, detected, etc. that are useful for at least some aspects of the present disclosure can include ultraviolet (UV), visible (VIS), and infrared (IR). Wavelengths and/or wavelength ranges can be from about 100 nm to about 5000 nm. In at least one aspect, the wavelength or wavelength range of electromagnetic energy can be from $\lambda 1$ to $\lambda 2$, where $\lambda 1$ and $\lambda 2$ can be, independently, e.g., about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, about 410 nm, about 420 nm, about 430 nm, about 440 nm, about 450 nm, about 460 nm, about 470 nm, about 480 nm, about 490 nm, about 500 nm, about 510 nm, about 520 nm, about 530 nm, about 540 nm, about 550 nm, about 560 nm, about 570 nm, about 580 nm, about 590 nm, about 600 nm, about 610 nm, about 620 nm, about 630 nm, about 640 nm, about 650 nm, about 660 nm, about 670 nm, about 680 nm, about 690 nm, about 700 nm, about 710 nm, about 720 nm, about 730 nm, about 740 nm, about 750 nm, about 760 nm, about 770 nm, about 780 nm, about 790 nm, about 800 nm, about 810 nm, about 820 nm, about 830 nm, about 840 nm, about 850 nm, about 860 nm, about 870 nm, about 880 nm, about 890 nm, about 900 nm, about 910 nm, about 920 nm, about 930 nm, about 940 nm, about 950 nm, about 960 nm, about 970 nm, about 980 nm, about 990 nm, about 1000 nm, about 1010 nm, about 1020 nm, about 1030 nm, about 1040 nm, about 1050 nm, about 1060 nm, about 1070 nm, about 1080 nm, about 1090 nm, about 1100 nm, about 1110 nm, about 1120 nm, about 1130 nm, about 1140 nm, about 1150 nm, about 1160 nm, about 1170 nm, about 1180 nm, about 1190 nm, about 1200 nm, about 1210 nm, about 1220 nm, about 1230 nm, about 1240 nm, about 1250 nm, about 1260 nm, about 1270 nm, about 1280 nm, about 1290 nm, about 1300 nm, about 1310 nm, about 1320 nm, about 1330 nm, about 1340 nm, about 1350 nm, about 1360 nm, about 1370 nm, about 1380 nm, about 1390 nm, about 1400 nm, about 1410 nm, about 1420 nm, about 1430 nm, about 1440 nm, about 1450 nm, about 1460 nm, about 1470 nm, about 1480 nm, about 1490 nm, about 1500 nm, about 1510 nm, about 1520 nm, about 1530 nm, about 1540 nm, about 1550 nm, about 1560 nm, about 1570 nm, about 1580 nm, about 1590 nm, about 1600 nm, about 1610 nm, about 1620 nm, about 1630 nm, about 1640 nm, about 1650 nm, about 1660 nm, about 1670 nm, about 1680 nm, about 1690 nm, about 1700 nm, about 1710 nm, about 1720 nm, about 1730 nm, about 1740 nm, about 1750 nm, about 1760 nm, about 1770 nm, about 1780 nm, about 1790 nm, about 1800 nm, about 1810 nm, about 1820 nm, about 1830 nm, about 1840 nm, about 1850 nm, about 1860 nm, about 1870 nm, about 1880 nm, about 1890 nm, about 1900 nm, about 1910 nm, about 1920 nm, about 1930 nm, about 1940 nm, about 1950 nm, about 1960 nm, about 1970 nm, about 1980 nm, about 1990 nm, about 2000 nm, 2010 nm, about 2020 nm, about 2030 nm, about 2040 nm, about 2050 nm, about 2060 nm, about 2070 nm, about 2080 nm, about 2090 nm, about 2100 nm, about 2110 nm, about 2120 nm, about 2130 nm, about 2140 nm, about 2150 nm, about 2160 nm, about 2170 nm, about 2180 nm, about 2190 nm, about 2200 nm, about 2210 nm, about 2220 nm, about 2230 nm, about 2240 nm, about 2250 nm, about 2260 nm, about 2270 nm, about 2280 nm, about 2290 nm, about 2300 nm, about 2310 nm, about 2320 nm, about 2330 nm, about 2340 nm, about 2350 nm, about 2360 nm, about 2370 nm, about 2380 nm, about 2390 nm, about 2400 nm, about 2410 nm, about 2420 nm, about 2430 nm, about 2440 nm, about 2450 nm, about 2460 nm, about 2470 nm, about 2480 nm, about 2490 nm, about 2500 nm, about 2510 nm, about 2520 nm, about 2530 nm, about 2540 nm, about 2550 nm, about 2560 nm, about 2570 nm, about 2580 nm, about 2590 nm, about 2600 nm, about 2610 nm, about 2620 nm, about 2630 nm, about 2640 nm, about 2650 nm, about 2660 nm, about 2670 nm, about 2680 nm, about 2690 nm, about 2700 nm, about 2710 nm, about 2720 nm, about 2730 nm, about 2740 nm, about 2750 nm, about 2760 nm, about 2770 nm, about 2780 nm, about 2790 nm, about 2800 nm, about 2810 nm, about 2820 nm, about 2830 nm, about 2840 nm, about 2850 nm, about 2860 nm, about 2870 nm, about 2880 nm, about 2890 nm, about 2900 nm, about 2910 nm, about 2920 nm, about 2930 nm, about 2940 nm, about 2950 nm, about 2960 nm, about 2970 nm, about 2980 nm, about 2990 nm, about 3000 nm, 3010 nm, about 3020 nm, about 3030 nm, about 3040 nm, about 3050 nm, about 3060 nm, about 3070 nm, about 3080 nm, about 3090 nm, about 3100 nm, about 3110 nm, about 3120 nm, about 3130 nm, about 3140 nm, about 3150 nm, about 3160 nm, about 3170 nm, about 3180 nm, about 3190 nm, about 3200 nm, about 3210 nm, about 3220 nm, about 3230 nm, about 3240 nm, about 3250 nm, about 3260 nm, about 3270 nm, about 3280 nm, about 3290 nm, about 3300 nm, about 3310 nm, about 3320 nm, about 3330 nm, about 3340 nm, about 3350 nm, about 3360 nm, about 3370 nm, about 3380 nm, about 3390 nm, about 3400 nm, about 3410 nm, about 3420 nm, about 3430 nm, about 3440 nm, about 3450 nm, about 3460 nm, about 3470 nm, about 3480 nm, about 3490 nm, about 3500 nm, about 3510 nm, about 3520 nm, about 3530 nm, about 3540 nm, about 3550 nm, about 3560 nm, about 3570 nm, about 3580 nm, about 3590 nm, about 3600 nm, about 3610 nm, about 3620 nm, about 3630 nm, about 3640 nm, about 3650 nm, about 3660 nm, about 3670 nm, about 3680 nm, about 3690 nm, about 3700 nm, about 3710 nm, about 3720 nm, about 3730 nm, about 3740 nm, about 3750 nm, about 3760 nm, about 3770 nm, about 3780 nm, about 3790 nm, about 3800 nm, about 3810 nm, about 3820 nm, about 3830 nm, about 3840 nm, about 3850 nm, about 3860 nm, about 3870 nm, about 3880 nm, about 3890 nm, about 3900 nm, about 3910 nm, about 3920 nm, about 3930 nm, about 3940 nm, about 3950 nm, about 3960 nm, about 3970 nm, about 3980 nm, about 3990 nm, about 4000 nm, 4010 nm, about 4020 nm, about 4030 nm, about 4040 nm, about 4050 nm, about 4060 nm, about 4070 nm, about 4080 nm, about 4090 nm, about 4100 nm, about 4110 nm, about 4120 nm, about 4130 nm, about 4140 nm, about 4150 nm, about 4160 nm, about 4170 nm, about 4180 nm, about 4190 nm, about 4200 nm, about 4210 nm, about 4220 nm, about 4230 nm, about 4240 nm, about 4250 nm, about 4260 nm, about 4270 nm, about 4280 nm, about 4290 nm, about 4300 nm, about 4310 nm, about 4320 nm, about 4330 nm, about 4340 nm, about 4350 nm, about 4360 nm, about 4370 nm, about 4380 nm, about 4390 nm, about 4400 nm, about 4410 nm, about 4420 nm, about 4430 nm, about 4440 nm, about 4450 nm, about 4460 nm, about 4470 nm, about 4480 nm, about 4490 nm, about 4500 nm, about 4510 nm, about 4520 nm, about 4530 nm, about 4540 nm, about 4550 nm, about 4560 nm, about 4570 nm, about 4580 nm, about 4590 nm, about 4600 nm, about 4610 nm, about 4620 nm, about 4630 nm, about 4640 nm, about 4650 nm, about 4660 nm, about 4670 nm, about 4680 nm, about 4690 nm, about 4700 nm, about 4710 nm, about 4720 nm, about 4730 nm, about 4740 nm, about 4750 nm, about 4760 nm, about 4770 nm, about 4780 nm, about 4790 nm, about 4800 nm, about 4810 nm, about 4820 nm, about 4830 nm, about 4840 nm, about 4850 nm, about 4860 nm, about 4870 nm, about 4880 nm, about 4890 nm, about 4900 nm, about 4910 nm, about 4920 nm, about 4930 nm, about 4940 nm, about 4950 nm, about 4960 nm, about 4970 nm, about 4980 nm, about 4990 nm, or about 5000 nm, as long as $\lambda 1 < \lambda 2$.

Example electromagnetic energy transmitted, emitted, detected, etc. that are useful for at least some aspects of the present disclosure can include UV-C (about 180 nm to about 280 nm), or UV-B (about 280 nm to about 315 nm), UV-A (about 315 nm to about 400 nm), and Visible (such as about 380 nm to about 450 nm, 4 about 50 nm to about 495 nm, about 495 nm to about 570 nm, about 570 nm to about 590 nm, about 590 nm to about 620 nm, or about 620 nm to about 750 nm).

Figure 1B:
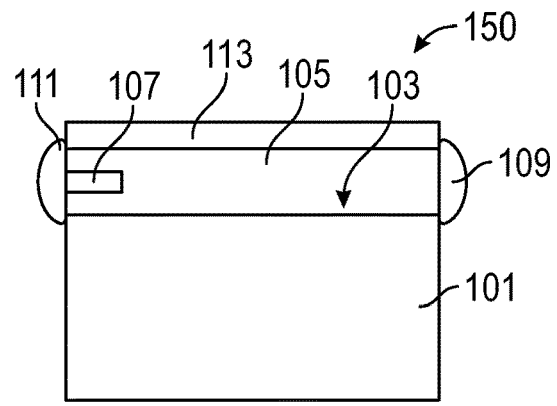
FIG. 1B is an example system for monitoring the structural health of a component according to at least one aspect of the present disclosure.

FIG. 1B illustrates an example system 150 for monitoring the structural condition/health of a component 101 according to at least one aspect. As shown in FIG. 1B, the example system 150 can include a topcoat layer 113 at least partially disposed on a surface of the ME layer 105. The topcoat layer 113 can serve to protect, at least, the ME layer from, e.g., abrasion, corrosion, oxidation, and the escape of electromagnetic energy. In some aspects, the topcoat layer 113 can include a material that is opaque and/or reflective. The topcoat layer 113 need not be disposed directly on, or adjacent to, a surface of the ME layer 105. For example, and in at least one aspect, the topcoat layer 113 can be at least partially disposed on a surface of a component.

Figure 2A:
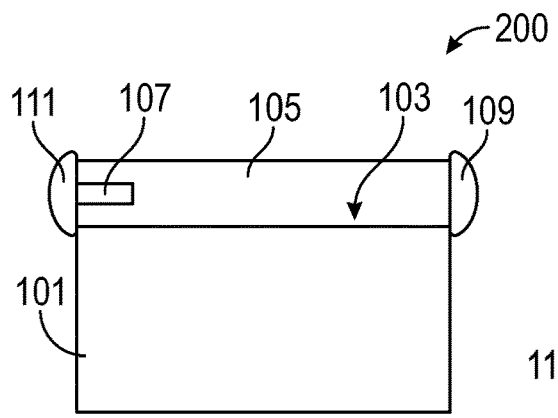
FIGS. 2A-2D illustrates an example system under an applied stimulus according to at least one aspect of the present disclosure.
Figure 2B:
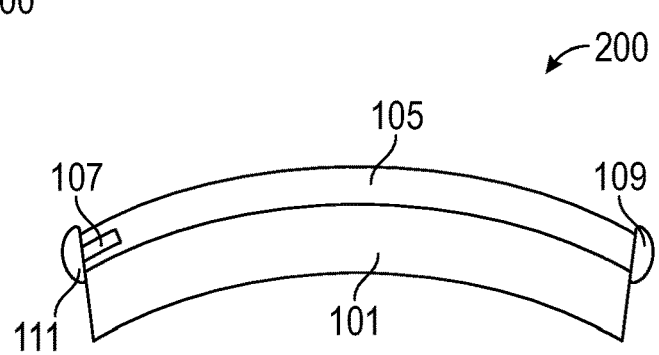

FIGS. 2A-2D illustrate an example system 200 in various states of stress. Although FIGS. 2A-2D are shown without a topcoat layer, certain aspects of the example system 200 can include a topcoat layer. In FIG. 2A the example system 200 is under no apparent stress and FIG. 2B shows the example system 200 under an amount of stress, e.g., bending. The stress on the component 101 imparts stress on the ME layer 105. Because of the stress, the ME layer transmits electromagnetic energy that can be detected by the detector or sensor 109. Additionally, or alternatively, the ME layer can act like a filter depending on the stress level and how it changes the optical properties of the ME layer.

Figure 2C:
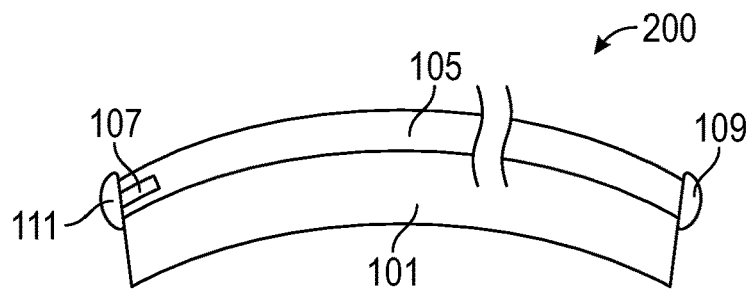
Figure 2D:
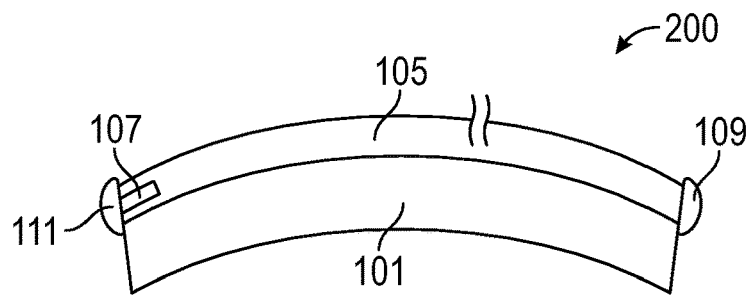

FIG. 2C illustrates a state where the stress on the component 101 causes a defect or crack that extends through the ME layer 105. Here, the transmission can be zero in the region where the crack is located. However, because the ME layer 105 can extend over a wide area of the component 101, there can be transmission of electromagnetic energy detectable by the detector or sensor 109. FIG. 2D shows the example system having a minor defect in the ME layer 105. In FIG. 2D, the system can still provide data in cases of a partial failure, which can be different and distinct from a full failure.

The present disclosure also generally provides coated, or at least partially coated, components. In at least one aspect, the ME layer 105 described herein can at least partially cover a surface 103 of a component 101, forming a coated, or at least partially coated, component.

The component 101 can be made from and/or include any suitable material that can benefit from structural health monitoring. As illustrative, non-exclusive examples, the component 101 can be made from and/or include a metal and/or a metal alloy. Non-limiting examples of metals and metal alloys include aluminum, aluminum alloy, copper, copper alloy, iron, iron alloy, steel, steel alloy, titanium, titanium alloy, magnesium, magnesium alloy, or a combination thereof. In at least one aspect, the component 101 can define, and/or can be a portion of, one or more components of an article, such as an aircraft, a watercraft, a spacecraft, a land vehicle, a satellite, consumer electronics (such as antennas, car radios, mobile phones, and telecommunications base stations), a wind turbine, a bridge, a building, a pipeline, and/or any component that can benefit from structural health monitoring.

Figure 3:
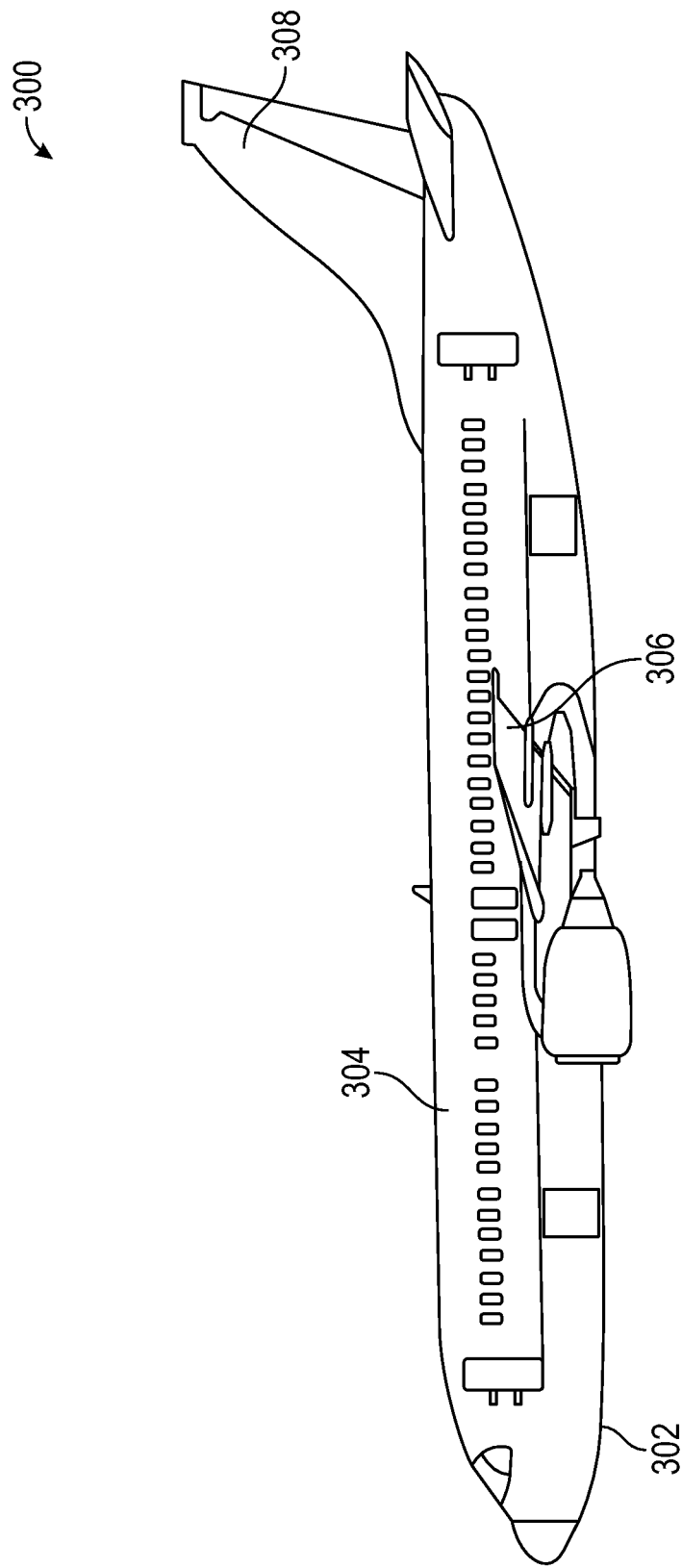
FIG. 3 is an aircraft comprising example components to be monitored according to at least one aspect of the present disclosure.

FIG. 3 is an aircraft comprising example components to be monitored according to at least one aspect of the present disclosure. FIG. 3 is a non-limiting example implementation to illustrate aspects of the present disclosure. As shown in FIG. 3, aircraft 300 includes an underside 302, an elongated body 304, a wing 306 extending laterally from the body 304, and a tail 308 extending longitudinally from the body 304. The ME layer 105, and optionally topcoat layer 113, can be applied to at least a portion of a surface of these and other components of an aircraft such that the ME layer 105, and optionally the topcoat layer 113, can be at least partially disposed on a surface of an aircraft component. The topcoat layer 113 need not be disposed directly on, or adjacent to, the ME layer 105. For example, and in at least one aspect, the topcoat layer 113 can be at least partially disposed on a surface of a component. Additional, or alternative examples, of components of aircraft that can be monitored can include landing gear, panels, joints, airfoils (such as a rotor blade), auxiliary power units, a nose of an aircraft, fuel tanks, a tail cone, a coated lap joint between two or more panels, a wing-to-fuselage assembly, a structural aircraft composite, a fuselage body-joint, a wing rib-to-skin joint, and/or other internal component.

The ME layer 105 can be an already-prepared polymer in solution (e.g., a carrier and/or solvent) which can then be coated onto one or more surfaces of a component. The carrier and/or solvent can then be allowed and/or caused to evaporate. Additionally, or alternatively, the ME layer 105 can be an already-prepared polymer in a UV-curable "solvent" or reactive diluent that could be coated on one or more components as a pattern, and then cured. This can eliminate the need for drying. Additionally, or alternatively, the ME layer 105 can be made of a polymer that is not formed until curing. For example, the polymer precursors can be dissolved, if necessary, in a reactive diluent. Curing, e.g., by a UV cure, can then form the ME polymer.

The ME layer 105 can be made of or include a ME layer precursor. In at least one aspect, the ME layer precursor can be cured, resulting in a cured ME layer or a portion of a cured ME layer. Curing can include solvent evaporation, application of heat, light, electrical potential, and/or a chemical reactant. Curing can also include a chemical reaction, polymerization, cross-linking, and/or generally any method that results in a stable coating. The ME layer precursor can be applied to a surface of the component and then cured, resulting in a permanent, or semi-permanent, ME layer 105 on the component 101. In at least one aspect, the component 101 can be pretreated before application of the ME layer precursor. The ME layer 105 and/or ME layer precursor can be a solid, a powder, a gel, a sol-gel, a liquid, or a liquefiable composition at room temperature (e.g., from about 15° C. to about 25° C.).

The ME layer 105 and/or ME layer precursor can be applied alone, or with at least one other material, to at least partially coat, encapsulate, or cover a surface of a component 101. The ME layer 105 and/or ME layer precursor can be formulated as a chemical conversion coating, a pretreatment, a sealant, a paint, a gel, a thin film, or a resin. The ME layer 105 and/or ME layer precursor can optionally include a pigment, a binder, a surfactant, an organic particle, a diluent, a solvent, other formulation additives, or a combination thereof. The ME layer 105 and/or ME layer precursor optionally can be applied to at least a portion of a component by, e.g., painting, printing, spraying, electro-spraying, electro-coating, powder coating, fusion bonding, and/or immersing at least a portion of the component with and/or within a ME layer 105 and/or ME layer precursor.

The ME layer 105 can take the form of a layer, a conformal coating, a film, a membrane, and/or a biofilm on or in the component. The ME layer 105 and/or ME layer precursor can include additives that provide chemical resistance, abrasion resistance, oxidation resistance, germicidal characteristics, ice-repellant properties, or a combination thereof.

In at least one aspect, the topcoat layer 113 can at least partially cover the ME layer 105, so as to be at least partially disposed on the ME layer 105. In some aspects, the topcoat layer 113 can be applied to at least a portion of a component such that the topcoat layer 113 is not disposed directly on, or adjacent to, the ME layer 105. The topcoat layer 113 can provide chemical resistance, abrasion resistance, oxidation resistance, germicidal characteristics, ice-repellant properties, or a combination thereof. Additionally, or alternatively, the topcoat layer 113 can be made of a material that aids in preventing the escape of electromagnetic energy. In these and other aspects, the topcoat layer 113 can include a material that is opaque or reflective. The topcoat layer 113 may be made from any material known in the art, such as a polyurethane material, such as aliphatic trifunctional polyurethanes. The topcoat layer 113 may be made of a material that is selected for its resistance to fuel, hydraulic fluid, oil, de-icing solutions, rain, and a combination thereof. The topcoat can be a basecoat/clearcoat system. An example topcoat is Desothane™ HD basecoat-clearcoat system (PPG Industries). The topcoat layer 113 can be applied in a similar manner as the ME layer 105 and/or ME layer precursor. A complex composite component manufactured by high-temperature molding and machining can have the ME layer on the component and a topcoat layer on the ME layer for environmental endurance. As another example, the ME layer can be placed in a simple composite component during fabrication.

The thickness of the topcoat layer 113 can be modulated depending on, e.g., the component and how the component is manufactured. As an example, a topcoat layer may be thicker when used with a component that is unshielded from the environment such as a wheel well. As another example, a topcoat layer may be less thick (or not used) where the component is well-protected, e.g., a component inside the cabin or cargo compartment.

The present disclosure also generally provides methods for forming a structural health monitoring system. These systems can be self-monitoring. As discussed above, the system can include an ME layer 105 and the component 101 to be monitored. The ME layer can be applied to a component 101 after the ME layer 105 has been cured and/or a ME layer precursor can be applied to a component 101 prior to curing/hardening. Additionally, or alternatively, the system can include a topcoat layer 113.

Figure 4A:
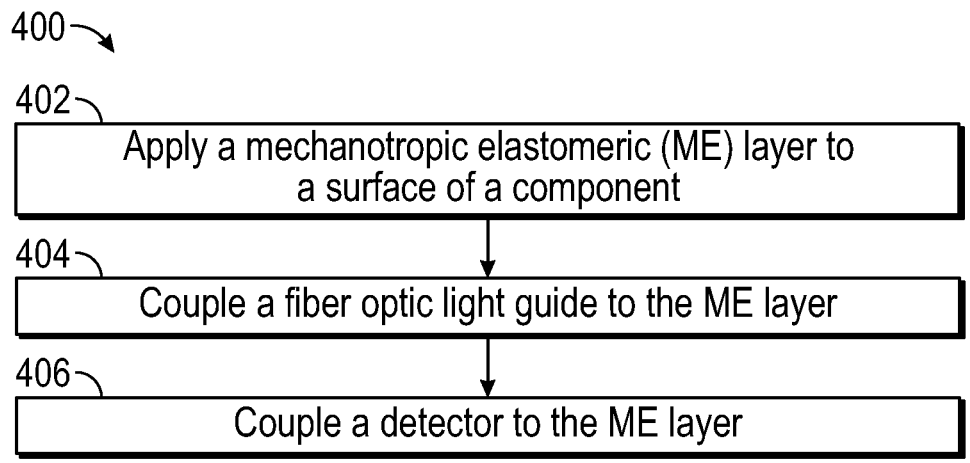
FIG. 4A is a flow chart illustrating an example method for forming a system for monitoring the structural health of a component according to at least one aspect of the present disclosure.

FIG. 4A is a flow chart that illustrates an example method 400 for forming a system for monitoring the structural condition/health of a component according to at least one aspect. The example method 400 can include applying a mechanotropic elastomeric (ME) layer to a surface of a component to be monitored at operation 402. Example method 400 can further include coupling a fiber optic light guide to the ME layer using, e.g., an optical adhesive at operation 404. The example method 400 can further include coupling a detector or sensor to the ME layer using, e.g., an optical adhesive at operation 406. As described above, the ME layer can be applied alone, or with other materials, to at least partially coat, encapsulate, or cover a component to be monitored. The ME layer can be applied, e.g., painted, in a pattern as appropriate for the component. The ME layer can be formulated as a chemical conversion coating, a pretreatment, a sealant, a paint, a gel, a thin film, or a resin. The ME layer can optionally include a pigment, a binder, a surfactant, an organic particle, a diluent, a solvent, other formulation additives, or a combination thereof. In some aspects, an electromagnetic energy source can be coupled to the fiber optic light guide or an electrical signal as described above. The electromagnetic energy source can be coupled permanently to the component to enable real-time monitoring or it can be coupled periodically to the component, such as, in instances where scheduled maintenance can be performed as described above.

Figure 4B:
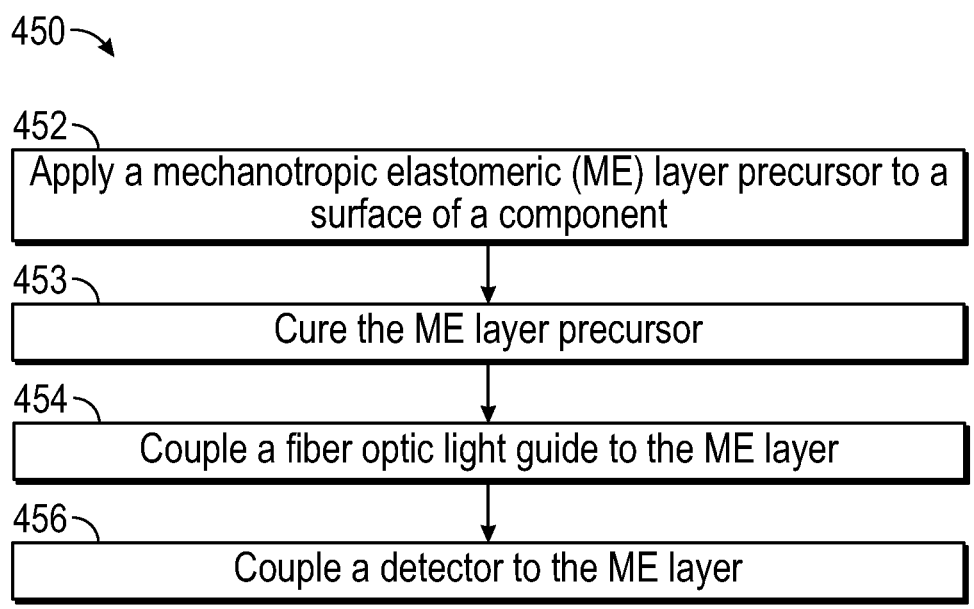
FIG. 4B is a flow chart illustrating an example method for forming a system for monitoring the structural health of a component according to at least one aspect of the present disclosure.

FIG. 4B is a flow chart that illustrates an example method 450 for forming a system for monitoring the structural condition/health of a component according to at least one aspect. The example method 450 can include applying a ME layer precursor to a surface of a component to be monitored at operation 452. The ME layer precursor can be applied alone, or with other materials, to at least partially coat, encapsulate, or cover a component. The ME layer precursor can be formulated as a chemical conversion coating, a pretreatment, a sealant, a paint, a gel, a thin film, or a resin. The ME layer precursor can optionally include a pigment, a binder, a surfactant, an organic particle, a diluent, a solvent, other formulation additives, or a combination thereof. Example method 450 can further include curing the ME layer precursor under curing conditions to form the ME layer at operation 453. In at least one aspect, the curing conditions can include curing at a temperature of from about 10° C. to about 150° C., such as from about 20° C. to about 100° C., such as from about 30° C. to about 70° C., such as from about 40° C. to about 50° C.; curing under vacuum, nitrogen, or air; and/or curing for a time period of from about 10 minutes to about 24 hours. The cured composition may comprise one or more layers each, independently, having a thickness of about 0.1 mil or more, such as from about 0.1 mil to about 600 mil, such as from about 0.5 mil to about 500 mil, such as from about 5 mil to about 100 mil, such as from about 10 mil to about 50 mil. Curing conditions may also include exposing the ME layer precursor to heat, UV, moisture, a catalyst, a hardener, and the like.

Example method 450 can further include coupling a fiber optic light guide to the ME layer using, e.g., an optical adhesive at operation 454. Example method 450 can further include coupling a detector or sensor to the ME layer using, e.g., an optical adhesive at operation 456. In some aspects, an electromagnetic energy source can be coupled to the fiber optic light guide or an electrical signal as described above. The electromagnetic energy source can be coupled permanently to enable real-time monitoring or it can be coupled periodically, such as, in instances where scheduled maintenance can be performed as described above.

Non-limiting examples of methods of applying the ME layer, ME layer precursor, and curing are described above. Non-limiting examples of components include those components described above.

Figure 5:
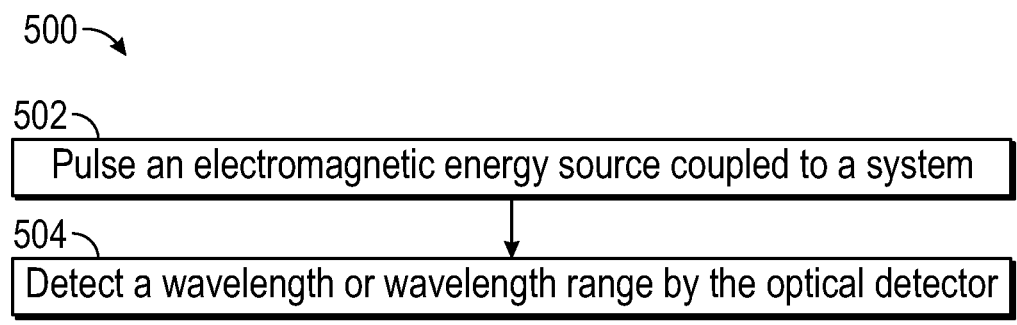
FIG. 5 is a flow chart illustrating an example method for monitoring the structural health of a component according to at least one aspect of the present disclosure.

The present disclosure also generally provides methods for monitoring the structural condition/health of a component. FIG. 5 is a flow chart that illustrates an example method 500 for monitoring the structural condition/health of a component according to at least one aspect. Example method 500 can include pulsing an electromagnetic energy source coupled to a system at operation 502, the system including a ME layer. The system can also include a fiber optic light guide and a detector or sensor. As an alternative, or in addition, to the fiber optic light guide, and as described above, an electrical signal sent by, e.g., a light-emitting diode (LED) can be used. As described above, the electromagnetic energy source can be coupled permanently to the component to enable real-time monitoring and/or it can be coupled periodically to the component, such as, in instances where scheduled maintenance can be performed. The ME layer can be disposed (or partially disposed) on any surface of the component. The fiber optic light guide and/or the electrical signal can be in optical communication with the ME layer and the optical detector or sensor.

The pulsing of the electromagnetic energy source can be continuous or periodic. Depending on the objective, the pulses of electromagnetic energy can be at predetermined time intervals, such as every second(s), every minute(s), and so forth. In at least one aspect, measurements can be acquired at predetermined time intervals, such as every second(s), every minute(s), and so forth.

Example method 500 can further include detecting a wavelength or wavelength range by the optical detector or sensor at operation 504. The wavelength or wavelength range, which may be predetermined, can be responsive to application of an amount of stimulus and can be indicative of a defect in the component. For example, if ingress of moisture were a mode of failure, then using a frequency where $H_2O$ absorbs, then the system could be designed to be a specific water detector. The O—H stretch at 3400 cm(−1) or about 3.5 microns is an example. The system could use 3.5 microns and some other wavelength where water is transparent to look simultaneously for water and for general signal retention/loss.

To determine if the detected energy (wavelength or wavelength range) is indicative of a change in condition of a component (e.g., a defect or deformation of the component), the detected energy can be compared to a threshold wavelength value or threshold wavelength range. A defect or deformation of the component can be indicated when the detected energy passes, exceeds, falls below, or falls outside of, a threshold wavelength value or threshold wavelength range.

The example method 500 can further include performing maintenance on the component, inspecting the component, ordering a component or portion of a component, replacing a component or portion of a component. Additionally, or alternatively, the example method 500 can include a system that incorporates a contacting system to, e.g., contact a user, a pilot, a building maintenance office, a highway department, and the like, that an inspection is needed on the component.

A color change transmitted by the ME layer can be monitored which can enable multiple wavelengths to be monitored at the same time. Monitoring multiple wavelengths at the same time can allow for two ranges of responses to be used. For example, one range of response can be relatively sensitive to changes and can be used for routing monitoring of the component. The other range of response, for example, can be less sensitive to changes, and used for failure of a component. In these and other aspects, the difference between the two responses can provide useful information on the level of stress on the ME layer. As an example, an ME layer can exhibit a color change on application of stress and the wavelength or wavelength range corresponding to that frequency can be used as a signal-bearing frequency. Another wavelength or wavelength range, which can be either shorter or longer than the signal-bearing frequency, and may not be affected by the color change (e.g., the ME layer is transparent at such a frequency). The frequency at which the ME layer is transparent can be used as a constant or reference frequency.

Methods of monitoring the structural condition/health of a component can include selecting an ME layer based on, at least, the ME layer having a wavelength or wavelength range (λref) that is shorter or longer than a signal-bearing frequency, and at which the ME layer is transparent. A wavelength or wavelength range detected (λdet), can be responsive to application of an amount of stimulus and can be indicative of a defect in the component. λdet can be the signal-bearing frequency. A shift from λref to λdet can indicate a defect in the component.

The systems and methods for structural health monitoring described herein can enable automatic, continuous (and/or periodic) monitoring of structural components. Thereby any stresses, strains, and damages in the form of cracks, fractures, detachments, delaminations, or corrosion damage can be detected in order to ensure the structural integrity of components. The structural health monitoring system described herein is suitable for integration in an existing production process for a component and enables self-diagnosis. In addition, the systems and methods described herein can enable detection of structural defects and damage that can be hidden under a surface coating.

The present disclosure provides, among others, the following examples, each of which may be considered as optionally including any alternate aspects.

Clause 1. A system for monitoring structural health of a component, comprising:
a mechanotropic elastomeric (ME) layer at least partially disposed on a surface or subsurface of the component, the ME layer having a first portion corresponding to a first end of the component and a second portion corresponding to a second end of the component;
a fiber optic light guide coupled to the first end by a first adhesive; and
an optical detector coupled to the second end by a second adhesive.

Clause 2. The system of Clause 1, further comprising an electromagnetic energy source coupled to the fiber optic light guide.

Clause 3. The system of Clause 1 or Clause 2, wherein the ME layer transmits a wavelength or wavelength range in response to an amount of stimulus.

Clause 4. The system of any one of Clauses 1-3, wherein the ME layer transmits a wavelength of wavelength range from about 180 nm to about 5000 nm.

Clause 5. The system of any one of Clauses 1-4, further comprising a topcoat layer.

Clause 6. The system of Clause 5, wherein the topcoat layer is at least partially disposed on a surface of the ME layer.

Clause 7. The system of any one of Clauses 1-6, wherein the component is a component of an aircraft, a watercraft, a spacecraft, a land vehicle, a satellite, a consumer electronic, a wind turbine, a building, a bridge, or a pipeline.

Clause 8. A method for forming a system for monitoring structural health of a component, comprising:
applying a mechanotropic elastomeric (ME) layer to a surface or subsurface of the component, the ME layer having a first portion corresponding to a first end of the component and a second portion corresponding to a second end of the component;
coupling a fiber optic light guide to the first end of the ME layer using a first adhesive; and
coupling an optical detector to the second end of the ME layer using a second adhesive.

Clause 9. The method of Clause 8, further comprising coupling an electromagnetic energy source to the fiber optic light guide using a third adhesive.

Clause 10. The method of Clause 8 or Clause 9, wherein applying a ME layer on a surface or subsurface of the component comprises:
applying a ME layer precursor to the surface or subsurface of the component; and
curing the ME layer precursor.

Clause 11. The method of any one of Clauses 8-10, further comprising applying a topcoat to a surface of the ME layer.

Clause 12. The method of any one of Clauses 8-11, wherein the ME layer transmits a wavelength or wavelength range in response to an amount of stimulus.

Clause 13. The method of any one of Clauses 8-12, wherein the component is a component of an aircraft, a watercraft, a spacecraft, a land vehicle, a satellite, a consumer electronic, a wind turbine, a building, a bridge, or a pipeline.

Clause 14. A method for monitoring structural health of a component, comprising:
pulsing an electromagnetic energy source coupled to a system, the system comprising a mechanotropic elastomeric (ME) layer, a fiber optic light guide, and an optical detector, the ME layer having a reference wavelength or wavelength range; and detecting a wavelength or wavelength range by the optical detector, the detected wavelength or wavelength range being responsive to application of an amount of stimulus and being indicative of a deformation or a defect in the component, wherein the ME layer is at least partially disposed on a surface or subsurface of the component, and wherein the fiber optic light guide is in optical communication with the ME layer and with the optical detector.

Clause 15. The method of Clause 14, wherein the detected wavelength or wavelength range indicates a defect or deformation when the detected wavelength is different than the reference wavelength or wavelength range.

Clause 16. The method of Clause 14 or Clause 15, wherein the ME layer transmits a wavelength of wavelength range from about 180 nm to about 5000 nm.

Clause 17. The method of any one of Clauses 14-16, further comprising one or more of performing maintenance on the component, inspecting the component, ordering a component, or replacing a component.

Clause 18. The method of any one of Clauses 14-17, wherein the component is a component of an aircraft, a watercraft, a spacecraft, a land vehicle, a satellite, a consumer electronic, a wind turbine, a building, a bridge, or a pipeline.

Clause 19. A structure for monitoring structural health of a component, the structure comprising a mechanotropic elastomeric (ME) layer and a topcoat layer.

Clause 20. The structure of Clause 19, wherein the component is a component of an aircraft.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

All documents described herein are incorporated by reference herein, including any priority documents and/or testing procedures to the extent they are not inconsistent with this text. As is apparent from the foregoing general description and the specific aspects, while forms of this disclosure have been illustrated and described, various modifications can be made without departing from the spirit and scope of this disclosure. Accordingly, it is not intended that this disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A system for monitoring structural health of a component, the system comprising:
    a mechanotropic elastomeric (ME) layer at least partially disposed on a surface or subsurface of the component, the ME layer comprising an elastomer, an elastomeric material, or combinations thereof, the ME layer having a first portion corresponding to a first end of the component and a second portion corresponding to a second end of the component;
    a fiber optic light guide coupled to the first end by a first adhesive; and
    an optical detector coupled to the second end by a second adhesive.

2. The system of claim 1, further comprising an electromagnetic energy source coupled to the fiber optic light guide.

3. The system of claim 1, wherein the ME layer transmits a wavelength or wavelength range in response to an amount of stimulus.

4. The system of claim 3, wherein the wavelength or wavelength range is from about 180 nm to about 5000 nm.

5. The system of claim 1, further comprising a topcoat layer.

6. The system of claim 5, wherein the topcoat layer is at least partially disposed on a surface of the ME layer.

7. The system of claim 1, wherein the component is a component of an aircraft, a watercraft, a spacecraft, a land vehicle, a satellite, a consumer electronic, a wind turbine, a building, a bridge, or a pipeline.

8. A method for forming a system for monitoring structural health of a component, the method comprising:
    applying a mechanotropic elastomeric (ME) layer to a surface or subsurface of the component, the ME layer comprising an elastomer, an elastomeric material, or combinations thereof, the ME layer having a first portion corresponding to a first end of the component and a second portion corresponding to a second end of the component;
    coupling a fiber optic light guide to the first end of the ME layer using a first adhesive; and
    coupling an optical detector to the second end of the ME layer using a second adhesive.

9. The method of claim 8, further comprising coupling an electromagnetic energy source to the fiber optic light guide using a third adhesive.

10. The method of claim 8, wherein applying the ME layer to the surface or subsurface of the component comprises:
    applying a ME layer precursor to the surface or subsurface of the component; and
    curing the ME layer precursor.

11. The method of claim 8, further comprising applying a topcoat to a surface of the ME layer.

12. The method of claim 8, wherein the ME layer transmits a wavelength or wavelength range in response to an amount of stimulus.

13. The method of claim 8, wherein the component is a component of an aircraft, a watercraft, a spacecraft, a land vehicle, a satellite, a consumer electronic, a wind turbine, a building, a bridge, or a pipeline.

14. A method for monitoring structural health of a component, the method comprising:

pulsing an electromagnetic energy source coupled to a system, the system comprising:
an optical detector;
a mechanotropic elastomeric (ME) layer, the ME layer comprising an elastomer, an elastomeric material, or combinations thereof, the ME layer having a reference wavelength or wavelength range; and
a fiber optic light guide in optical communication with the ME layer and with the optical detector; and
detecting a wavelength or wavelength range by the optical detector, the detected wavelength or wavelength range being responsive to application of an amount of stimulus and being indicative of a deformation or a defect in the component,
wherein the ME layer is at least partially disposed on a surface or subsurface of the component.

15. The method of claim 14, wherein the detected wavelength or wavelength range indicates the deformation or the defect in the component when the detected wavelength or wavelength range is different than the reference wavelength or wavelength range.

16. The method of claim 14, wherein the wavelength or wavelength range is from about 180 nm to about 5000 nm.

17. The method of claim 14, further comprising one or more of performing maintenance on the component, inspecting the component, ordering a component, or replacing a component.

18. The method of claim 14, wherein the component is a component of an aircraft, a watercraft, a spacecraft, a land vehicle, a satellite, a consumer electronic, a wind turbine, a building, a bridge, or a pipeline.

19. A structure for monitoring structural health of a component, the structure comprising:
a mechanotropic elastomeric (ME) layer, the ME layer comprising an elastomer, an elastomeric material, or combinations thereof; and
a topcoat layer.

20. The structure of claim 19, wherein the component is a component of an aircraft.

* * * * *